United States Patent
Whitty

[11] 3,853,096
[45] Dec. 10, 1974

[54] SMALL ANIMAL FEEDER

[76] Inventor: Albert J. Whitty, 39055 Lyndon, Livonia, Mich. 48154

[22] Filed: Mar. 16, 1973

[21] Appl. No.: 341,982

[52] U.S. Cl. .................................. 119/18, 119/60
[51] Int. Cl. ............................................ A01k 05/00
[58] Field of Search ......................... 119/60, 18, 51

[56] References Cited
UNITED STATES PATENTS

| | | | |
|---|---|---|---|
| 2,970,566 | 2/1961 | Detrick | 119/18 |
| 3,273,537 | 9/1966 | Orr | 119/60 X |

FOREIGN PATENTS OR APPLICATIONS

| | | | |
|---|---|---|---|
| 88,138 | 6/1921 | Switzerland | 119/60 |

*Primary Examiner*—Hugh R. Chamblee
*Attorney, Agent, or Firm*—Hauke, Gifford, Patalidis & Dumont

[57] ABSTRACT

An animal feeder to contain pelletized food for feeding laboratory animals having spaced apart vertical wires forming the front, back and side walls and two groups of mutually perpendicular wires forming a gridwork base. The wires which form the base are integral with the bars which form the walls. The space between adjacent wires of the walls is smaller than any dimension of pelletized food, but of sufficient distance to allow the animal to eat the food through and between the bars. However, the space between the wires forming the gridwork base, in addition to being smaller than any dimension of the pelletized food, is also of a size which prevents the animal from eating the pelletized food through the base. The feeder also includes a hinged cover which has a latch to secure it in place over a top opening of the cage. The feeder is removably attached to a structure containing the animal by hooks attached to the back wall of the feeder.

9 Claims, 4 Drawing Figures

PATENTED DEC 10 1974   3,853,096

SMALL ANIMAL FEEDER

BACKGROUND OF THE INVENTION

I. Field of the Invention

The present invention pertains to animal feeders, and is particularly directed to animal feeders for feeding small animals in a laboratory environment wherein control over the quality of the food is required.

II. Description of the Prior Art

Many different types of animal feeders are presently available, however, most of the prior art devices have openings in the side walls and the bottom which are of the same size. Thus food which can be removed through the side walls will fall through the bottom. Also such feeders permit the animal to reach the food contained therein from the bottom of the feeder, and to pull large pieces of food out of the feeder through the walls. The animal will, usually, drop the food obtained through the bottom because of the awkward position assumed in so getting it. In addition, the animal, having pulled large pieces of food from the feeder, will lay it on the floor of its cage to eat it. As a result, food is wasted and contaminated when it contacts foreign matter on the floor of the cage.

An object of the present invention is to obviate these drawbacks by providing a readily manufactured feeder constructed of grill work arranged to provide smaller openings in the bottom than are provided in the sidewalls. Further objects of this invention are to provide an animal feeder which eliminates the necessity of a caretaker having to refill the feeder everyday, to provide a feeder which is completely washable and adapted to be sterilized in an autoclave or the like, and to provide an animal feeder which is inexpensive.

SUMMARY OF THE INVENTION

The present invention provides a small animal feeder having an enclosure within which pelletized animal food is placed. Hook means are provided on the enclosure to secure the animal feeder on a cage containing the animal to be fed. The enclosure is formed of front, back and side walls of parallel spaced apart wires, and a base of mutually perpendicular groups of parallel spaced apart wires. Each of the elongated wires is U-shaped so that it forms a part of each opposite wall as well as a part of the base. The perpendicular U-shaped members then provide a base which has smaller openings than the elongated openings provided in the side walls. A closed peripheral rim is affixed to the ends of the wires forming the walls at the end of the enclosure opposite the base. This rim acts as a reinforcement, a mounting for a hinged cover, and defines a top opening through which the feeder is filled with food pellets. The cover has a hinge on one side which is operatively connected to the peripheral rim and a latch on an opposite side which engages the rim to secure the cover in place.

The spacing between the wires which form the walls of the feeder are smaller than any of the dimensions of the pelletized food, however, the spacing is sufficient to allow the animal to eat the food between the wires. This prevents the animal from pulling large pieces of food from the feeders where it would fall to the floor and become contaminated, and forces it to eat the food piecemeal therefrom. The spaces bound by the mutually perpendicular wires of the base are too small for the animal to insert its snout therethrough and too small to permit food to fall therethrough, thus, precluding the possibility of the animal from reaching the food through the bottom of the feeder and from food falling through the feeder to the floor of the cage.

BRIEF DESCRIPTION OF THE DRAWINGS

In the following drawings presented for exemplary purposes, like reference numerals refer to like parts throughout the several views in which.

DETAILED DESCRIPTION OF THE INVENTION

Figure 1:
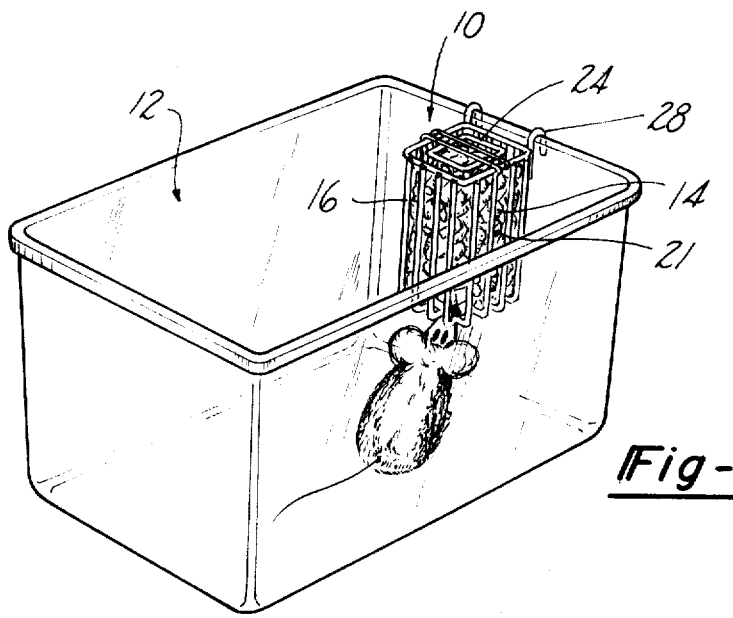
FIG. 1 is a perspective view of an animal containing structure upon which is secured an embodiment of the feeder of the present invention.

FIG. 1 shows the animal feeder, generally denoted as 10, mounted on a structure 12 confining an animal to be fed, and containing therein pelletized animal food 14.

Figure 2:
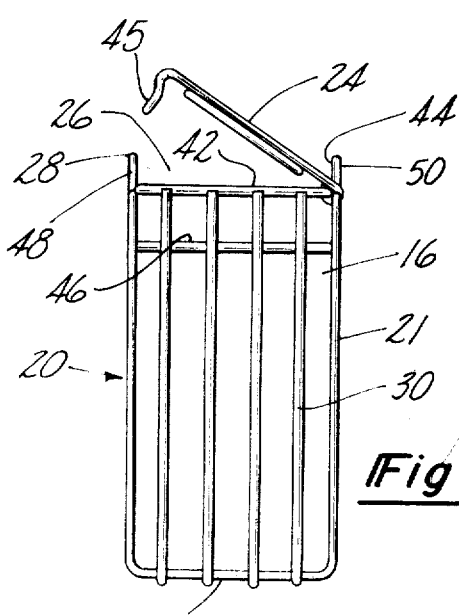
FIG. 2 is a front view of the feeder of FIG. 1.
Figure 3:
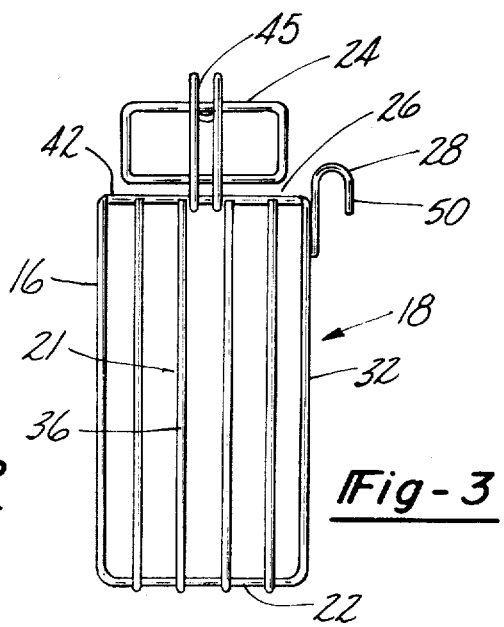
FIG. 3 is a side view of the feeder of FIG. 1.
Figure 4:
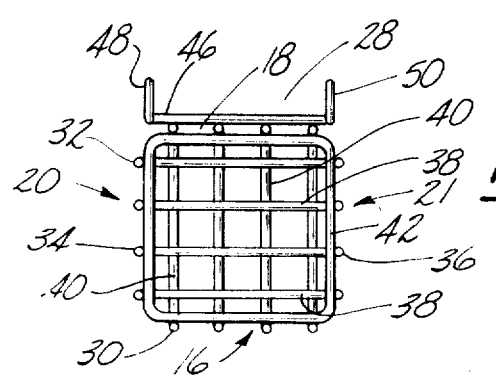
FIG. 4 is a top view of the feeder of FIG. 1 with the cover removed.

As can more clearly be seen in FIGS. 2, 3 and 4, the animal feeder 10 includes a front wall 16, a back wall 18, first and second side walls 20 and 21, respectively, a base 22, a cover 24 to close a top opening 26 defined by a closed peripheral rim 42 and hook means 28 to secure the feeder to the animal confining structure 12.

With particular reference to FIGS. 2, 3 and 4, the front wall 16, a portion of the base 22 and back wall 18 are formed from a plurality of spaced U-shaped wire members 30. The side walls 20 and 21 are formed of similar U-shaped wire members 32. The wire members 30 and 32 are mutually perpendicular to one another so that the base 22 is a gridwork defined by a plurality of generally square openings. The U-shaped members 30 and 32 are secured together by welding to cooperate with a closed peripheral rim 42 fastened to the upper ends of the U-shaped wire members 30 and 32 to provide a completed feeder. The rim 42 defines an opening 26 through which the feeder is filled with food pellets 14.

The cover 24 includes a hinge member 44 disposed on one side, and a latch 45 located on the side thereof opposite the hinge member 44. The hinge member 44 cooperates with the rim 42 to form a hinge which secures the cover 24 to the feeder and allows it to pivot between the open and closed positions.

The hook means 28, by which the feeder 10 is attached to the animal containing structure 12, is illustrated as being formed of an intermediate bar 46 and two hooks 48 and 50 integrally formed with the bar 46 at opposte ends and disposed at right angles thereto. The hook means 28 is disposed relative to the feeder 10 so that the hooks 48 and 50 extend above the rim 42, and is fastened to the feeder 10 by, for example, welding the bar 46 to the wire members 30 of back wall 18. Alternatively, the hooks 48 and 50 may be integral with any two of the wire members 30, in effect being extensions thereof, thus, eliminating the intermediate bar 46.

The spacing between any two adjacent parallel spaced apart wire members forming the front wall, side walls, back wall and base of the feeder is a predetermined distance smaller than the smallest dimension of the pelletized food to be used in the feeder and is such as to preclude the animal from inserting its snout through the opening defined in the base while allowing it to insert its snout between the elongated members of the walls.

It has been found that for feeding small animals of the rodent family, such as hamsters, mice and rats, that a rim 42 of 9 gauge, wire members of 13 gauge and a spacing of 0.375 inches between adjacent parallel wire members works satisfactorily for containing pelletized food such as "Purina Laboratory Chow" and other similar pelletized food. In addition, an overall size of 2 inches wide, 2 inches deep and 4 inches high for the feeder has been found to be appropriate to contain from 12 to 46 days food supply for the various species of the rodent family hereinabove mentioned.

The feeder 10 of the present invention is easily installed in an animal containing structure 12 by merely placing the hooks 48 and 50 over a top edge of the structure which allows the feeder 10 to hang in the structure. The feeder 10 is easily filled with pelletized food 14 by displacing the latch 45 from contact with the rim 42 and pivoting the cover 24 around the hinge to gain access to the interior of the feeder 10 through the top opening 26.

Because the feeder is of a size to hold from 12 to 46 days food supply, a caretaker is not required to keep a daily check on the food supply. In addition, because the animal cannot insert its snout through the openings in the base 22 of the feeder, and because it cannot remove large pieces of the food through the walls, a great amount of food which would otherwise be wasted if the animal were allowed to so get at the food, is saved. Also, because the present invention forces the animal to eat the food piece-meal through the walls of the feeder, and does not allow it to remove large pieces of food which it would then lay on the floor of its confining structure to eat, contamination of the food with foreign matter is prevented. The purity of the food it eats is, thus, maintained.

Further, the open structure of the present invention allows the feeder to be completely washable and made sterile in an autoclave or the like.

The foregoing detailed description is given primarily for clarity of understanding and no unnecessary limitations should be understood therefrom, for other modifications will be obvious to those skilled in the art and may be made without departing from the spirit of the invention or the scope of the appended claims.

I claim:

1. An animal feeder for containing pelletized animal food of predetermined dimensions comprising:
    an enclosure having a closed peripheral rim defining a top opening, a front wall of parallel spaced apart elongated members, a back wall of parallel spaced apart elongated members, two side walls of parallel spaced apart members, and a base of two mutually perpendicular groups of parallel spaced apart elongated members forming a gridwork, each of said members of one group of parallel spaced apart elongated members being integral with a different one of said parallel spaced apart members of said first side wall and a different one of said parallel spaced apart members of said second side wall, each of said members of the other group of parallel spaced apart elongated members being integral with a different one of said parallel spaced apart members of said front wall and said closed peripheral rim being affixed to the ends of said parallel spaced apart elongated members of said front wall, said back wall and said side walls at the opposite end of said enclosure from said base;
    a top structure to close said top opening having a hinge member on one side operatively associated with said closed peripheral rim, and a latch disposed on an opposite side from said hinge to engage said peripheral rim to secure said top structure in place over said opening;
    hook means disposed on said back wall to secure said animal feeder to a structure which confines an animal;
    said mutually peripendicular groups of parallel elongated members forming said gridwork base being secured together at their cross-over points;
    said hook means comprising at least two hooks, each of said hooks being integral with a different one of said parallel spaced apart elongated members of said back wall and extending above said top opening; and
    the width of the space defined between adjacent parallel elongated members of said front wall, said back wall, said side walls and said base being approximately 0.375 inches, said elongated members of said front wall, said back wall, said side wall and said base being approximately 13 gauge, and said closed peripheral rim being approximately 9 gauge.

2. An animal feeder as defined in claim 1, wherein said elongated members are stainless steel or nickel plated so as to be non-toxic.

3. An animal feeder for containing pelletized animal food of predetermined dimensions comprising:
    an enclosure having a closed peripheral rim defining a top opening, a front wall of parallel spaced apart elongated members, a back wall of parallel spaced apart elongated members, two side walls of parallel spaced apart members, and a base of two mutually perpendicular groups of parallel spaced apart elongated members forming a gridwork, each of said members of one group of parallel spaced apart elongated members being integral with a different one of said parallel spaced apart members of said first side wall and a different one of said parallel spaced apart members of said second side wall, each of said members of the other group of parallel spaced apart elongated members being integral with a different one of said parallel spaced apart members of said front wall and said closed peripheral rim being affixed to the ends of said parallel spaced apart elongated members of said front wall, said back wall and said side walls at the opposite end of said enclosure from said base; and
    the width of the space defined between adjacent parallel elongated members of said front wall, said back wall, said side walls and said base being approximately 0.375 inches, said elongated members of said front wall, said back wall, said side wall and said base being approximately 13 gauge, and said close peripheral rim being approximately 9 gauge.

4. An animal feeder as defined in claim 3, wherein said hook means comprises an intermediate bar having an integral hook located at each end, said hooks being disposed at right angles to said bar, and said intermediate bar being secured to said back wall in close proximity to said top opening so that said hooks extend above said top opening.

5. An animal feeder as defined in claim 3, wherein said hook means comprise at least two hooks, each of said hooks being integral with a different one of said parallel spaced apart elongated members of said back wall and extending above said top opening.

6. An animal feeder as defined in claim 3, wherein each of said integral spaced apart elongated members of said first and second side walls and one group of spaced apart elongated members of said base form a generally U-shaped member.

7. An animal feeder as defined in claim 3, wherein each of said integral spaced apart elongated members of said back and front walls and one group of spaced apart elongated members of said base form a generally U-shaped member.

8. The animal feeder as defined in claim 3 and wherein said rim is fastened to said wire members defining an opening for said animal feeder and a top structure fastened to said rim for closing said opening.

9. An animal feeder for containing pelletized animal food of predetermined dimensions comprising:
an enclosure having a closed peripheral rim defining a top opening, a front wall of parallel spaced apart elongated members, a back wall of parallel spaced apart elongated members, two side walls of parallel spaced apart members, and a base of two mutually perpendicular groups of parallel spaced apart elongated members forming a gridwork, each of said members of one group of parallel spaced apart elongated members being integral with a different one of said parallel spaced apart members of said first side wall and a different one of said parallel spaced apart members of said second side wall, each of said members of the other group of parallel spaced apart elongated members being integral with a different one of said parallel spaced apart members of said front wall and said closed peripheral rim being affixed to the ends of said parallel spaced apart elongated members of said front wall, said back wall and said side walls at the opposite end of said enclosure from said base;

a top structure to close said top opening having a hinge member on one side operatively associated with said closed peripheral rim, and a latch disposed on an opposite side from said hinge to engage said peripheral rim to secure said top structure in place over said opening;

hook means disposed on said back wall to secure said animal feeder to a structure which confines an animal;

said mutually perpendicular groups of parallel elongated members forming said gridwork base being secured together at their cross-over points;

said hook means comprising an intermediate bar having an integral hook located at each end, said hooks being disposed at right angles to said bar, and said intermediate bar being secured to said back wall in close proximity to said top opening so that said hooks extend above said top opening;

each of said integral spaced apart elongated members of said first and second side walls and one group of spaced apart elongated members of said base forming a generally U-shaped member; and the width of the space defined between adjacent parallel elongated members of said front wall, said back wall, said side walls and said base is approximately 0.375 inches, said elongated members of said front wall, said back wall, said side walls and said base being approximately 13 gauge and said closed peripheral rim being approximately 9 gauge.

* * * * *